United States Patent
Humphreys

[11] Patent Number: 6,027,097
[45] Date of Patent: Feb. 22, 2000

[54] WATER STOP HOSE CONNECTOR

[75] Inventor: James W. Humphreys, Pentwater, Mich.

[73] Assignee: Lakeshore Automatic Products, Inc., Grand Haven, Mich.

[21] Appl. No.: 09/204,570

[22] Filed: Dec. 3, 1998

[51] Int. Cl.[7] .................................................. F16K 51/00
[52] U.S. Cl. ..................................... 251/149.6; 251/149.1
[58] Field of Search ............................... 251/149.1, 149.6

[56] References Cited

U.S. PATENT DOCUMENTS

| | | | |
|---|---|---|---|
| 1,092,673 | 4/1914 | Stephens . | |
| 2,099,335 | 11/1937 | Hansen | 284/19 |
| 2,344,740 | 3/1944 | Shaff | 285/169 |
| 2,377,812 | 6/1945 | Scheiwer | 285/169 |
| 3,334,860 | 8/1967 | Bolton | 251/149.1 |
| 4,143,853 | 3/1979 | Abramson | 251/149.1 |
| 4,167,204 | 9/1979 | Zeyra | 141/348 |
| 4,564,132 | 1/1986 | Lloyd-Davies | 222/522 |
| 4,683,916 | 8/1987 | Raines | 137/854 |
| 4,712,583 | 12/1987 | Pelmulder | 137/852 |
| 4,915,351 | 4/1990 | Hoffman | 251/149.1 |
| 5,607,139 | 3/1997 | Kjellberg | 521/149.6 |

FOREIGN PATENT DOCUMENTS 636557  7/1965  Italy .

*Primary Examiner*—Kevin Shaver
*Assistant Examiner*—David A. Bonderer
*Attorney, Agent, or Firm*—Price, Heneveld, Cooper, Dewitt and Litton

[57] ABSTRACT

A water stop hose connector having a male member and a female member having an open end and an O-ring dimensioned to receive an inner end of the male member, and detent balls and groove to retain the male and female members together, a quick connect, axially movable cylindrical collar movable over the detent balls to lock them in the detent groove and movable away from the detent balls to release them from the detent groove, a spring biasing the collar over the detent balls, a valve body retained in the female member and having a head, a stem, and a stop shoulder on the stem, and movable between first and second positions, the stem having flow openings, an O-ring around the valve body head, the valve body openings in the second position being in flow communication with the female member and in the first position being out of flow communication with the female member to prevent flow, the valve body being engaged by the male member axially inner end face when the male and female members are coupled, causing the valve body to move to the second position, and movable to the first position by water pressure when the male and female members are uncoupled.

8 Claims, 2 Drawing Sheets

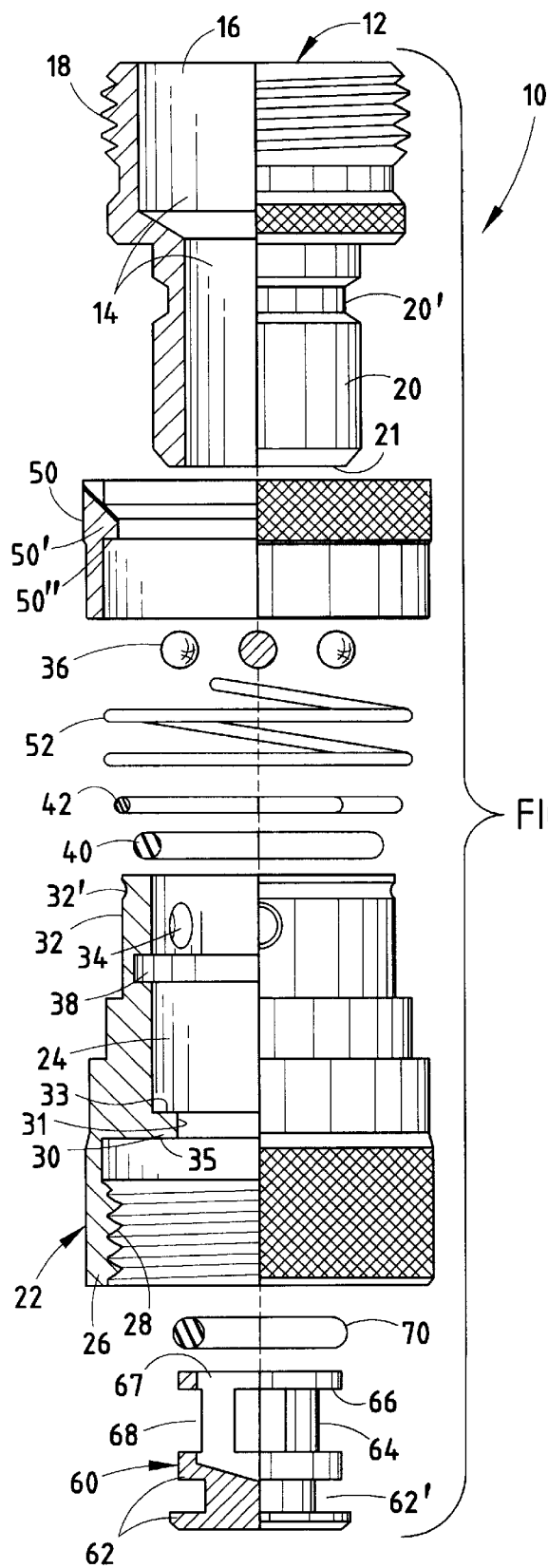
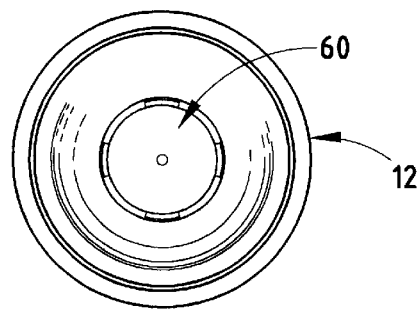
FIG. 2
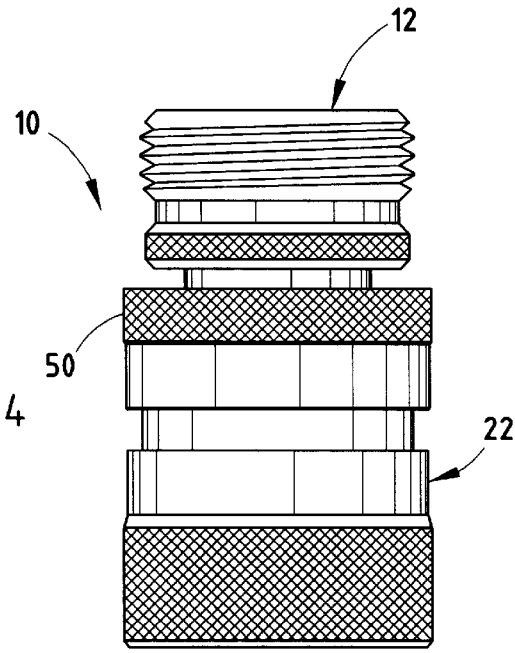
FIG. 1
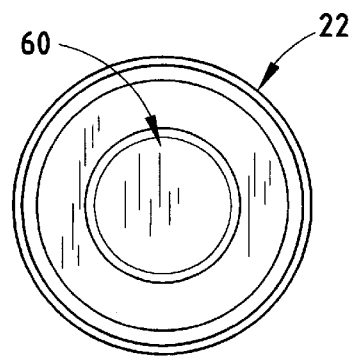
FIG. 3

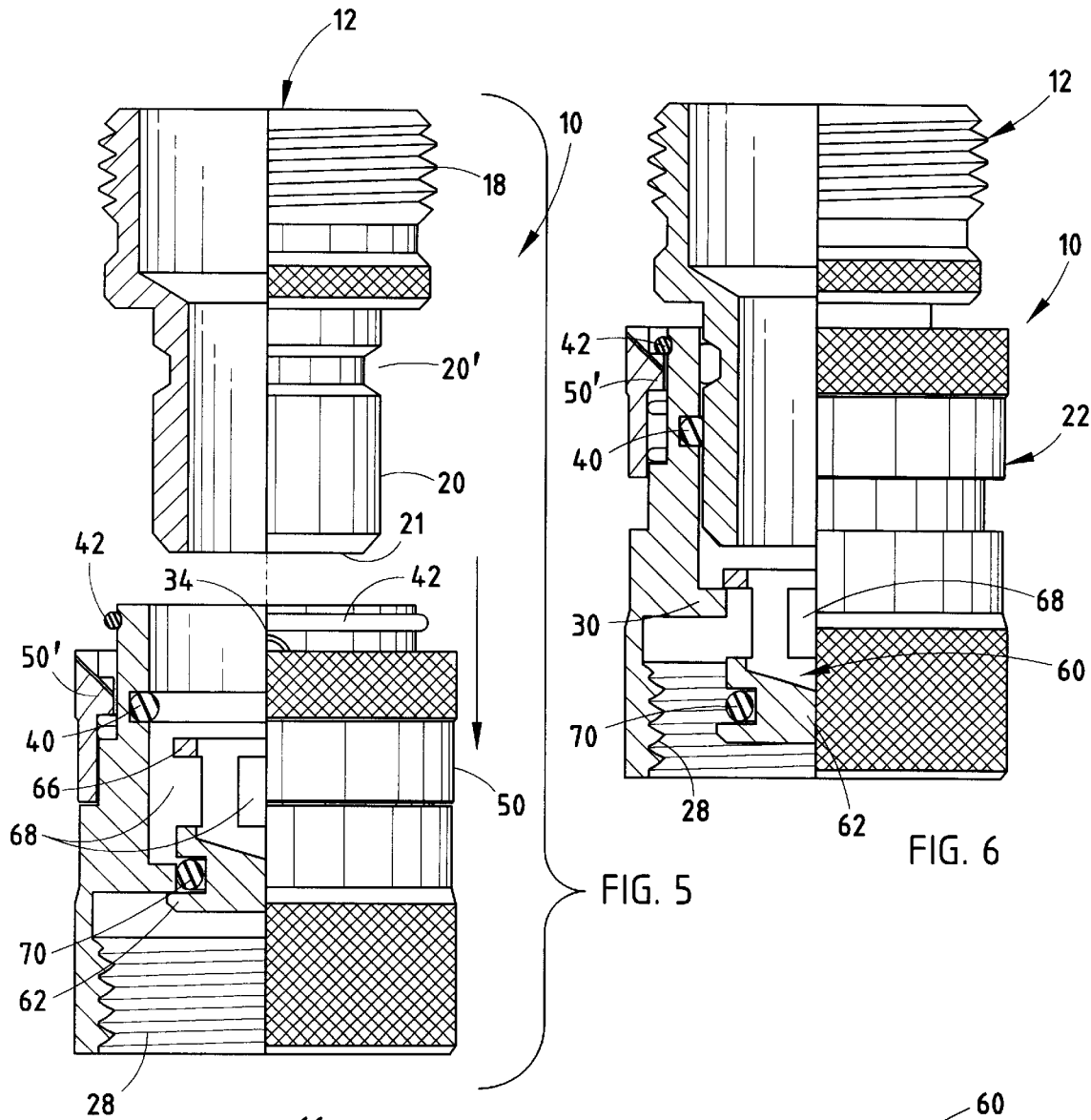
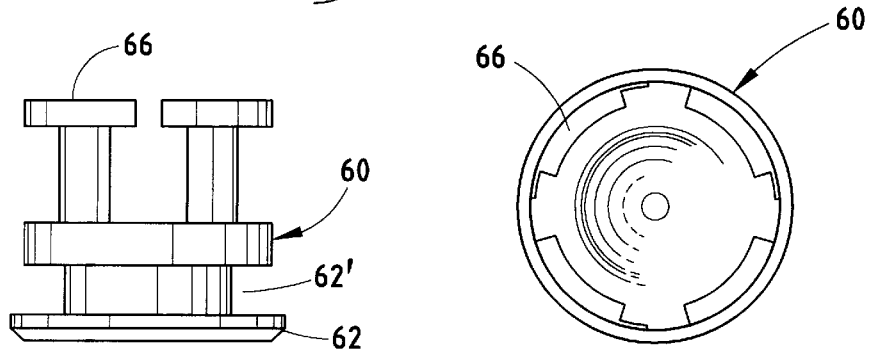
FIG. 7
FIG. 8

6,027,097

1

WATER STOP HOSE CONNECTOR

BACKGROUND OF THE INVENTION

This invention relates to quick disconnect couplings for garden hoses, and more particularly to a quick disconnect hose coupling and shutoff valve. Coupling devices to quickly connect and disconnect garden hoses to each other and to garden hose attachments such as sprinklers and nozzles have been known and marketed for some time. The term "hose attachment(s)", when used herein, is intended to mean sprinklers, nozzles, and similar components commonly attached to garden hoses. These coupling devices are usually made of plastic, and sometimes incorporate a valve mechanism to stop water flow in the uncoupled condition. Such a mechanism is complex. Better quality coupling devices made of brass and stainless steel provide a product that is more durable, but they typically do not have mechanism to stop water flow. One known brass connector that does stop water flow when uncoupled is basically a duplication of the complex mechanism found in plastic units, and is very expensive to manufacture. The inventor herein previously developed an improved product, set forth in U.S. Pat. No. 4,915,351. However, even that design was found to have practical shortcomings. Consequently, brass couplers for the lawn and garden industry are typically made without the water stop feature.

As to the couplers that do have a flow shutoff, almost all known designs use the same concept. A separate floating valve element on the inside of the unit is forced away from its seat by the insertion of the mating coupler half, thus allowing water flow. When the two halves are disconnected, either water pressure or spring pressure forces the element back to its seat, stopping water flow. Although the location and configuration of these internal components vary between manufacturers, the principle of operation is much the same. They are all traditional spring-disc valves. The length of the valve itself and the length of its travel from one end of its motion to the other, require that the body of the valve must be lengthened to accommodate the internal components. This is of critical cost importance when it is made of brass. In addition to the complexity and number of the internal components of presently known couplers, this traditional design also still requires a separate hose washer to seal the connection with the attached hose or hose attachment. The coupler and valve of my prior Pat. No. 4,915,351 has a different arrangement employing a deformable perforated rubber disc engaged by a specially designed male member.

SUMMARY OF THE INVENTION

The present invention constitutes a unique quick disconnect hose coupler and valve of few components and low cost, enabling practical manufacture of brass or stainless steel quick disconnect couplings with water shutoff during disconnect. The coupler has male and female members, a locking collar, and an axially shiftable valve member trapped in the female member. When the elements are connected, the inner end of the male member pushes the closure valve off its seat in the female member, to maximize water flow. The length of this novel structure is basically the same as a conventional brass coupler that does not have water flow control. Yet, the hose connector valve has quick disconnect and shutoff valve features. The components added for the plural function character are not complex and are relatively easy to manufacture and assemble.

These and other objects, advantages and features of this invention will become apparent upon studying the following detailed specification in conjunction with the drawings.

2

BRIEF DESCRIPTION OF THE DRAWINGS

FIG. 1 is an elevational view of the water stop hose connector embodying this invention;

FIG. 2 is an end elevational view of the male member of the connector in FIG. 1;

FIG. 3 is an end elevational view of the female connector in FIG. 1;

FIG. 4 is an exploded, partially sectioned, elevational view of the components of the connector in FIGS. 1–3;

FIG. 5 is a partially sectioned view of the connector, showing the male member and the female member separated;

FIG. 6 is a partially sectioned, elevational view of the connector as assembled;

FIG. 7 is an elevational view of the valve body in the connector; and

FIG. 8 is an upper end elevational view of the valve body in FIG. 7.

DESCRIPTION OF THE PREFERRED EMBODIMENT

Referring now specifically to the drawings, the water stop hose connector 10 includes a male member 12 and a female member 22 interconnectable with each other as shown in FIGS. 1 and 6, and disconnectable as in FIG. 5.

Male member 12 has an axial passageway 14 therethrough, a cylindrical, axial outer end 16, external male hose threads 18 on the outer periphery of this outer axial end, a cylindrical, axially inner end 20 with a cylindrical outer surface, an annular detent groove 20' in this outer surface, and an axially inner end face 21 on the inner end.

The female member 22 has an axial passageway 24 therethrough, an axially outer end portion 26 with internal female hose threads 28, and an annular transverse shoulder 30 on the axially inner end of the female hose threads. Shoulder 30 has an axially inner surface 33 and an axially outer surface 35. This female member also has an axially inner, cylindrical end 32 dimensioned to snugly receive the axially inner cylindrical end 20 of the male member. A plurality of circumferentially spaced, radially extending openings 34 through the female member cylindrical end 32 receive radially movable, spherical detent balls 36 in the respective openings. The radially inner end of each opening 34 is smaller in diameter than the diameter of balls 36 to prevent the balls from falling out. An O-ring groove 38 in the female member inner cylindrical end, and an O-ring 40 in this O-ring groove, seal against the male member inner end cylindrical outer surface. The female axially inner cylindrical end 32 has a radially outer cylindrical surface with an annular snap ring groove 32' therein and a snap ring 42 in this groove 32.

An axially movable cylindrical collar 50 extends around the axially inner cylindrical end 32 of female member 22. A snap ring 42 retains the collar on end 32. Collar 50 has an annular, radially inwardly extending shoulder 50' for retaining balls 36 in detent groove 20' when shoulder 50' is aligned with groove 20'. The collar is axially movable a limited amount over the detent balls 36 to lock them into the annular detent groove 20' of the male member, and is movable axially away from the detent balls to release them and allow them to move radially outwardly from this annular detent groove. A compression coil spring 52 extends 25 around end 32 of the female member and engages the transverse surface 50" of shoulder 50' of collar 50, to axially bias the collar in the position over detent balls 36. Collar 50 can be manually axially shifted toward the axially outer end of female member 22 to shift shoulder 50' away from the detent balls and thereby allow them to move radially outwardly out of the detent groove for quick disconnection of the male and female members, or quick connection thereof.

A valve body 60 is retained in the female member passageway. This valve body has a head 62, a stem 64, and a stop shoulder 66 on the opposite end of the stem from head 62. This stem has an axial opening 67 communicating with a plurality of lateral flow openings 68. The stop shoulder 66 is formed in segments (see FIGS. 7 and 8) to enable the stop shoulder portion to be radially expanded during assembly of the valve into the female member. The valve head 62 includes an annular O-ring groove 62' receiving an O-ring 70 for sealing against the peripheral throat 31 of shoulder 30 in female member 22.

In manufacture, the female member 22 is assembled with valve 60 by inserting the valve through the open axially outer end of the female member, and then enlarging the segmented shoulder 66 as with a die, to cause the stop shoulder 66 to be larger in diameter than throat 31 and thereby engageable with the transverse stop surface 33 of shoulder 30. Surface 33 is on the axially opposite side of shoulder 30 from surface 35. In the assembled condition, O-ring 70 is in place in groove 62' of valve 60, and O-ring 40 is in place in O-ring groove 38 (FIG. 5). Then detent balls 36 are in orifices 34, spring 52 is inserted over the cylindrical inner end 32 of female member 22, and collar 50 is placed over this end 32, pressing the collar against spring 52 sufficiently to enable snap ring 42 to be inserted in groove 32'. The female member is thus assembled, ready to be interconnected with or disconnected from male member 12.

During use, the connector could be in the assembled form shown in FIG. 6 where the male member is secured to the female member by shoulder 50' of collar 50 extending over the top of detent balls 36 to retain them in detent groove 20'. To disconnect the male member from the female member, collar 50 is moved axially from the position shown in FIG. 6, toward outer end 26 of female member 22 against the bias of compression coil spring 52 (FIG. 5), thereby releasing detent balls 36 from detent groove 20' of the male member, allowing the male member to be retracted from the female member.

When the male member is retracted from the female member, water pressure in the outer end of female member 22 shifts valve 60 to its closed position shown in FIG. 5, with O-ring 70 in engagement with throat 31 of shoulder 30, and the top flange of valve head 62 engaging surface 35 of this shoulder. Thus, when the coupling is disconnected, water flow will be stopped.

Reconnection of the male member with the female member is just as readily done by axially depressing collar 50 against spring 52 to release detent balls 36 and allow them to move, followed by insertion of the inner cylindrical portion 20 of male member 12 into the inner female end, and subsequent release of collar 50 to allow it to be biased over the detent balls to force them into detent groove 20' of the male member. This insertion of the inner end 21 of the male member into the female member causes its inner end 21 to engage the stop shoulder 66 of valve 60 and move valve head 62 and O-ring 70 away from shoulder 30 for allowing water flow through lateral openings 68 and axial opening 67 of valve 60, and therefore through the connector assembly.

The components are normally of machined stock, preferably brass.

The above description is considered that of the preferred embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the doctrine of equivalents.

What is claimed is:

1. A water stop hose connector comprising:

a male member having an axial-passageway therethrough, an axially outer end, external male hose threads on said axially outer end, an axially inner end with a cylindrical outer surface, an annular detent groove in said outer surface, and an inner end face on said axially inner end;

a female member having an axial passageway therethrough, an axially outer end portion with internal female hose threads, and an annular transverse shoulder at the axially inner end of said female hose threads;

said female member also having a cylindrical axially inner open end dimensioned to snugly receive said axially inner end of said male member;

a plurality of circumferentially spaced, radially extending openings through said female member axially inner end, and radially movable, spherical detent balls in said openings;

an O-ring groove in said female member cylindrical axially inner end and an O-ring in said O-ring groove to seal against said male member axially inner end cylindrical outer surface;

said female axially inner cylindrical end having an outer surface with a snap ring groove and a snap ring in said snap ring groove;

a quick connect, axially movable cylindrical collar on said female axially inner cylindrical end, said snap ring retaining said collar thereon, said collar having a shoulder movable over said detent balls to lock them in said annular detent groove of said male member, and movable away from said detent balls to release them from said annular detent groove;

a spring biasing said collar toward the position with said collar shoulder over said detent balls;

a valve body retained in said female member passageway and having a head, a stem, and a stop shoulder on said stem;

said stem having flow openings;

an O-ring around said valve body head;

said valve body being axially movable between first and second positions;

said valve body openings in said second position being in flow communication with said female member axially outer end portion to allow flow therebetween, and in said first position being out of flow communication with said female member axially outer end portion to prevent flow therebetween;

said valve body being engaged by said male member axially inner end face when said male and female members are coupled, causing said valve body to move to said second position with said flow openings in communication with said female member axially outer end portion, and said valve body being movable to said first position by water pressure in said female member when said male and female members are uncoupled, and said O-ring around said head engaging said transverse shoulder in said first position of said valve member, to seal off flow of water through said female member.

2. The water stop hose connector in claim 1 wherein said valve body stop shoulder is on the opposite surface of said female member annular transverse shoulder than said female member outer end portion, to thereby prevent movement of said valve body out of said female member.

3. The water stop hose connector in claim 2 wherein said valve body stop shoulder is configured to enable said shoulder to be expanded upon assembly of said valve body into said female member.

4. The water stop hose connector in claim 2 wherein said valve body stop shoulder is in circumferentially spaced segments to enable said shoulder to be expanded after assembly of said valve body into said female member.

5. A water stop hose connector comprising:

a male member having an axial passageway therethrough, an axially outer end, external male hose threads on said axially outer end, a cylindrical, axially inner end with a cylindrical outer surface, and an inner end face on said axially inner end;

a female member having an axial passageway therethrough, an axially outer end portion with internal female hose threads, an annular transverse shoulder adjacent the axially inner end of said female hose threads, and an axially inner, cylindrical open end dimensioned to snugly receive said cylindrical, axially inner end of said male member;

a detent connection between said male and female members;

a quick connect, axially movable cylindrical collar on said female axially inner cylindrical end, said collar being movable to lock and unlock said detent connection;

a valve body retained in said female body passageway and having a head, a stem, and a stop shoulder on said stem;

said stem having flow openings;

said valve body being axially movable between first and second positions;

said valve body openings in said second position being in flow communication with said female member axially outer end portion to allow flow therebetween, and in said first position being out of flow communication with said female member axially outer end portion to prevent flow therebetween;

said valve body stem being engaged by said male member inner end face when said male and female members are coupled, causing said valve body to move to said second position with said lateral flow openings in communication with said female member axially outer end portion, and said valve body being movable to said first position by water pressure in said female member when said male and female members are uncoupled, to shut off flow of water through said female member; and said valve body stop shoulder being on the opposite side of said female member annular transverse shoulder than said female member axially outer end portion to thereby prevent movement of said valve body out of said female member.

6. The water stop hose connector of claim 5 wherein said valve body at said valve body top shoulder is configured to enable said shoulder to be expanded during assembly of said valve body into said female member.

7. The water stop hose connector in claim 6 wherein said valve body at said valve body top shoulder is in spaced segments to enable said shoulder to be expanded during assembly of id valve body into said female member.

8. The water stop hose connector in claim 5 wherein said valve body has an O-ring for sealing against said female member transverse shoulder when in said first position.

* * * * *

UNITED STATES PATENT AND TRADEMARK OFFICE
CERTIFICATE OF CORRECTION

PATENT NO.  : 6,027,097
DATED : February 22, 2000
INVENTOR(S) : James W. Humphreys It is certified that error appears in the above-identified patent and that said Letters Patent is hereby corrected as shown below:

Column 2, line 65;
   Delete "25".

Column 6, claim 7, line 32;
   "id" should be --said--.

Signed and Sealed this

Twentieth Day of March, 2001

Attest:

NICHOLAS P. GODICI

*Attesting Officer*    *Acting Director of the United States Patent and Trademark Office*